US010626897B1

(12) United States Patent
Slate et al.

(10) Patent No.: US 10,626,897 B1
(45) Date of Patent: Apr. 21, 2020

(54) HYDRAULIC FLUID CONDITIONING DEVICE

(71) Applicant: AKG North America Inc., Mebane, NC (US)

(72) Inventors: Ryan Slate, Mebane, NC (US); Vykram Vijayasekaran, Mebane, NC (US)

(73) Assignee: AKG NORTH AMERICA INC., Mebane, NC (US)

( * ) Notice: Subject to any disclaimer, the term of this patent is extended or adjusted under 35 U.S.C. 154(b) by 0 days.

(21) Appl. No.: 16/409,484

(22) Filed: May 10, 2019

(51) Int. Cl.
| F15B 21/0423 | (2019.01) |
| B01D 35/147 | (2006.01) |
| F15B 21/041 | (2019.01) |
| F15B 21/045 | (2019.01) |
| F15B 21/048 | (2019.01) |
| F15B 21/00 | (2006.01) |

(52) U.S. Cl.
CPC ...... F15B 21/0423 (2019.01); B01D 35/1475 (2013.01); F15B 21/006 (2013.01); F15B 21/041 (2013.01); F15B 21/045 (2013.01); F15B 21/048 (2013.01)

(58) Field of Classification Search
CPC .... F15B 21/006; F15B 21/041; F15B 21/045; F15B 21/048; F15B 21/0423; B01D 35/18; B01D 35/1475; F28F 19/01; F28F 27/02
USPC ............................................ 210/774; 60/453
See application file for complete search history.

(56) References Cited

U.S. PATENT DOCUMENTS

| 5,988,265 | A * | 11/1999 | Marthaler | ................ F01P 11/06 123/196 AB |
| 6,105,660 | A * | 8/2000 | Knurr | ....................... F01P 3/18 165/140 |
| 7,232,518 | B2 * | 6/2007 | Wilkendorf | ........ B01D 35/0276 184/6.21 |
| 7,854,256 | B2 * | 12/2010 | Pineo | ....................... F01M 5/00 165/101 |
| 9,557,749 | B2 * | 1/2017 | Sheppard | ........... G05D 23/1852 |
| 9,945,623 | B2 * | 4/2018 | Sheppard | ................ F28F 27/00 |
| 10,138,771 | B2 * | 11/2018 | Ariyama | ................ F01M 5/002 |
| 2003/0146147 | A1 * | 8/2003 | Pohl | ..................... B01D 35/143 210/435 |
| 2006/0042567 | A1 * | 3/2006 | Figura | .................... B62D 5/062 123/41.14 |
| 2006/0081361 | A1 * | 4/2006 | Gabbey | .................. F01M 5/002 165/119 |
| 2008/0056887 | A1 * | 3/2008 | Iannizzaro | .............. F04C 2/086 415/121.2 |

(Continued)

Primary Examiner — Nathaniel E Wiehe
Assistant Examiner — Richard C Drake
(74) Attorney, Agent, or Firm — NK Patent Law (57) ABSTRACT

A device for cooling and filtering hydraulic fluid comprises a first chamber that includes a fluid inlet connection, a filter cartridge, a bypass manifold, and an inlet to a cooler; and, a second chamber that includes an outlet from the cooler and a fluid outlet connection. The cooler interconnects the first and second chambers through the inlet of the first chamber and the outlet of the second chamber. The bypass manifold is configured to return fluid entering the fluid inlet connection to the fluid outlet connection when a first pressure differential at the bypass manifold is above a first value, and to pass the fluid onto the filter cartridge when the first pressure differential at the bypass manifold is at or below the first value.

20 Claims, 9 Drawing Sheets

(56) References Cited

U.S. PATENT DOCUMENTS

| | | | |
|---|---|---|---|
| 2009/0236761 A1* | 9/2009 | Gembolis | F28D 1/04 |
| | | | 261/5 |
| 2009/0249813 A1* | 10/2009 | Zeolla | B01D 35/18 |
| | | | 62/317 |
| 2013/0256242 A1* | 10/2013 | Koelfgen | B01D 35/18 |
| | | | 210/774 |
| 2014/0116253 A1* | 5/2014 | Faulk | B01D 19/0042 |
| | | | 95/259 |
| 2015/0020995 A1* | 1/2015 | Merrill | F15B 1/26 |
| | | | 165/41 |
| 2015/0041414 A1* | 2/2015 | Squillante | B01D 35/18 |
| | | | 210/774 |
| 2016/0108876 A1* | 4/2016 | Waldschmidt | F02M 37/22 |
| | | | 123/446 |
| 2017/0167330 A1* | 6/2017 | Lee | F01M 1/02 |
| 2018/0264383 A1* | 9/2018 | Bisurkar | B01D 29/54 |

* cited by examiner

FIG. 8

HYDRAULIC FLUID CONDITIONING DEVICE

TECHNICAL FIELD

This disclosure relates to a fluid filtering and cooling device and, more particularly, to a device for filtering and cooling hydraulic fluid used in on-highway hydraulic drive systems, hydraulic oil storage systems, and similar other systems.

BACKGROUND

Hydraulic drive systems such as those associated with hydraulic fluid power systems represent quasi-hydrostatic drive systems that use pressurized hydraulic fluid to power hydraulic machinery. Hydraulic fluid used in these systems requires ongoing filtration and cooling to ensure proper operations of the hydraulic machinery. A filtering device for filtering the hydraulic fluid typically includes a chamber with through-openings for the to-be-filtered hydraulic fluid to flow into the chamber and for the filtered hydraulic fluid to flow out of the chamber, along with a filter element for filtering the hydraulic fluid. As an existing filter element continues to filter the hydraulic fluid, the filter element can get clogged and degraded resulting in reduced efficiency of the hydraulic drive system due to increased resistance to fluid flow offered by the clogged filter element.

Opportunities exist for providing a filtering device for filtering hydraulic fluids that selectively overcomes the inefficiencies associated with a degrading or degraded filter element in a cost-effective manner.

SUMMARY

This summary is provided to introduce in a simplified form concepts that are further described in the following detailed descriptions. This summary is not intended to identify key features or essential features of the claimed subject matter, nor is it to be construed as limiting the scope of the claimed subject matter.

Disclosed herein is a device for cooling, filtering and storing hydraulic fluid. The device comprises a first chamber that includes a fluid inlet connection, a filter cartridge, a bypass manifold, and an inlet to a cooler; and, a second chamber that includes an outlet from the cooler and a fluid outlet connection. The cooler interconnects the first and second chambers through the inlet of the first chamber and the outlet of the second chamber. The bypass manifold is configured to return fluid (such as, for example, cold, sluggish oil) entering the fluid inlet connection to the fluid outlet connection when a first pressure differential at the bypass manifold is above a first value, and to pass the fluid onto the filter cartridge when the first pressure differential at the bypass manifold is at or below the first value.

According to one or more embodiments, the filter cartridge includes a bypass valve configured to permit the fluid to bypass a filter element and return to the fluid outlet connection when a second pressure differential at the filter cartridge is greater than a second value.

According to one or more embodiments, the first value is approximately 60 PSI and the second value is approximately 30 PSI.

According to one or more embodiments, the filter cartridge is rated for approximately 10 microns.

According to one or more embodiments, the bypass manifold includes a bypass manifold valve that is spring-actuated.

According to one or more embodiments, the bypass value is spring-actuated.

According to one or more embodiments, the filter cartridge is configured for fluid flow from an inside of the filter cartridge to an outside of the filter cartridge.

According to one or more embodiments, the inlet to the cooler is positioned higher than the outlet from the cooler.

According to one or more embodiments, the device in configured to permit the fluid to flow upwards to the inlet to the cooler, flow downwards within the cooler, and flow out through the outlet of the cooler to the fluid outlet connection.

According to one or more embodiments, the fluid outlet connection is in fluid communication with a suction port of a hydraulic pump.

According to one or more embodiments, the fluid inlet connection is in fluid communication with a return line of a hydraulic pump.

According to one or more embodiments, the device is configured for a maximum fluid flow of approximately 35 gallons per minute. According to one or more embodiments, the device is configured for a maximum fluid flow of approximately 35 gallons per minute without introducing excess air into the fluid and without entrapping air. According to one or more embodiments, the device is configured for a maximum fluid flow of approximately 35 gallons per minute while minimizing or preventing early stages of cavitation.

According to one or more embodiments, the fluid inlet connection includes a flare fitting with an approximately 37-degree flare seating surface.

According to one or more embodiments, the device further comprises an air relief mechanism at or near a top surface of the reservoir. According to one or more embodiments, the device further comprises an air relief mechanism at or near a top surface of the reservoir, wherein the air relief mechanism is configured for venting at atmospheric pressure.

According to one or more embodiments, the device further comprises a filter cartridge access port at or near a top surface of the reservoir.

According to one or more embodiments, the first chamber further comprises a sight port for inspecting an inside of the first chamber. According to one or more embodiments, the sight port provides for inspecting a level of hydraulic fluid within the first chamber.

According to one or more embodiments, the second chamber further comprises a sight port for inspecting an inside of the second chamber.

According to one or more embodiments, the second chamber further comprises one or more of a cleanout port and an oil drain port.

According to one or more embodiments, the first chamber comprises a temperature sensor port.

According to one or more embodiments, the second chamber comprises a temperature sensor port.

BRIEF DESCRIPTION OF THE DRAWINGS

The foregoing, as well as the following Detailed Description of preferred embodiments, is better understood when read in conjunction with the appended drawings. For the purposes of illustration, there is shown in the drawings exemplary embodiments; however, the presently disclosed subject matter is not limited to the specific methods and instrumentalities disclosed.

The embodiments illustrated, described, and discussed herein are illustrative of the present invention. As these embodiments of the present invention are described with reference to illustrations, various modifications or adaptations of the methods and or specific structures described may become apparent to those skilled in the art. It will be appreciated that modifications and variations are covered by the above teachings and within the scope of the appended claims without departing from the spirit and intended scope thereof. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

FIG. 2C illustrates the reservoir with its front face removed for ease of understanding.

FIG. 6 further illustrates schematic layouts of a hydraulic pump and a flare fitting.

DETAILED DESCRIPTION OF THE EMBODIMENTS

Below, the technical solutions in the examples of the present invention are depicted clearly and comprehensively with reference to the figures according to the examples of the present invention. Obviously, the examples depicted here are merely some examples, but not all examples of the present invention. In general, the components in the examples of the present invention depicted and shown in the figures herein can be arranged and designed according to different configurations. Thus, detailed description of the examples of the present invention provided in the figures below are not intended to limit the scope of the present invention as claimed, but merely represent selected examples of the present invention. On the basis of the examples of the present invention, all of other examples that could be obtained by a person skilled in the art without using inventive efforts will fall within the scope of protection of the present invention. The present invention will be further described with reference to the accompanying drawings:

Embodiments of the presently disclosed subject matter relate to an integrated hydraulic conditioning system and more particularly to a cooler, tank, filter, and breather combination device that can be advantageously used for filtering, cooling and storing hydraulic fluid in on-highway hydraulic systems.

Embodiments of the presently disclosed subject matter comprise a filtering device that can be employed in hydraulic drive systems such as those employed in applications such as automotive machines, construction machinery, agricultural machines, and similar other applications. The filtering device for filtering hydraulic fluid in a hydraulic drive system as disclosed herein can advantageously prevent excessive energy loss when the filter element within the filtering device gets dirty, plugged-up, clogged up or otherwise offers an undesirable level of resistance to flow of hydraulic fluid therethrough. In some embodiments, the filtering device as described herein can be configured as a return-suction filter arranged upstream of a hydraulic pump whereby the hydraulic fluid flowing back from a hydraulic consumer can be filtered and cooled by the disclosed filtering device and supplied back to the hydraulic pump. In some embodiments, when the volumetric flow of the hydraulic fluid flowing back from the hydraulic consumer is greater than the volumetric flow delivered by the pump, i.e., in the case of an oversupply, the excess amount of hydraulic fluid flowing back can be filtered and then fed to a storage tank; alternately, when the volumetric flow flowing back from the hydraulic consumer is less than the volumetric flow delivered by the pump, i.e., in the case of an insufficient supply, hydraulic fluid can be taken from the storage tank and added to the filtered hydraulic fluid. The filtering device as disclosed herein can also advantageously cool the hydraulic fluid before supplying it back to the hydraulic pump.

Embodiments of the presently disclosed subject matter can filter the hydraulic fluid first, cool the hydraulic fuel then, and return the hydraulic fluid back into the hydraulic fluid drive system, while simultaneously permitting the bypass of cold and/or dirty hydraulic oil when there is excessive resistance offered by the filter element to hydraulic fluid flow, thus precluding the need for a separate set of piping, tanks or pumps to handle situations where the hydraulic oil is dirty and/or cold.

Disclosed herein is a device for cooling, filtering, and storing hydraulic fluid. The device comprises a first chamber that includes a fluid inlet connection, a filter cartridge, a [fluid inlet, bypass manifold, filter, inlet to cooler] bypass manifold, and an inlet to a cooler; and, a second chamber that includes an outlet from the cooler and a fluid outlet connection. The cooler interconnects the first and second chambers through the inlet of the first chamber and the outlet of the second chamber. The cooler interconnects the first and second chambers through the inlet of the first chamber and the outlet of the second chamber by means of internal plumbing, i.e., without using external accessories such as hoses, fittings and similar other external accessories. In other words, the cooler interconnects the first and second chamber by internally plumbing it through the inlet of the first chamber and outlet of the second chamber. Such a setup is advantageous compared to using hoses, fittings, and similar other external accessories that can require additional space, additional parts, and incur additional costs. The bypass manifold is configured to return fluid such as, for example, cold, sluggish oil entering the fluid inlet connection to the fluid outlet connection when a first pressure differential at the bypass manifold is above a first value, and to pass the fluid onto the filter cartridge when the first pressure differential at the bypass manifold is at or below the first value.

Embodiments of the presently disclosed subject matter can accordingly include a fluid inlet connection, bypass spring valve, a filter cartridge with integrated bypass and an inlet to the cooler.

Figure 1:
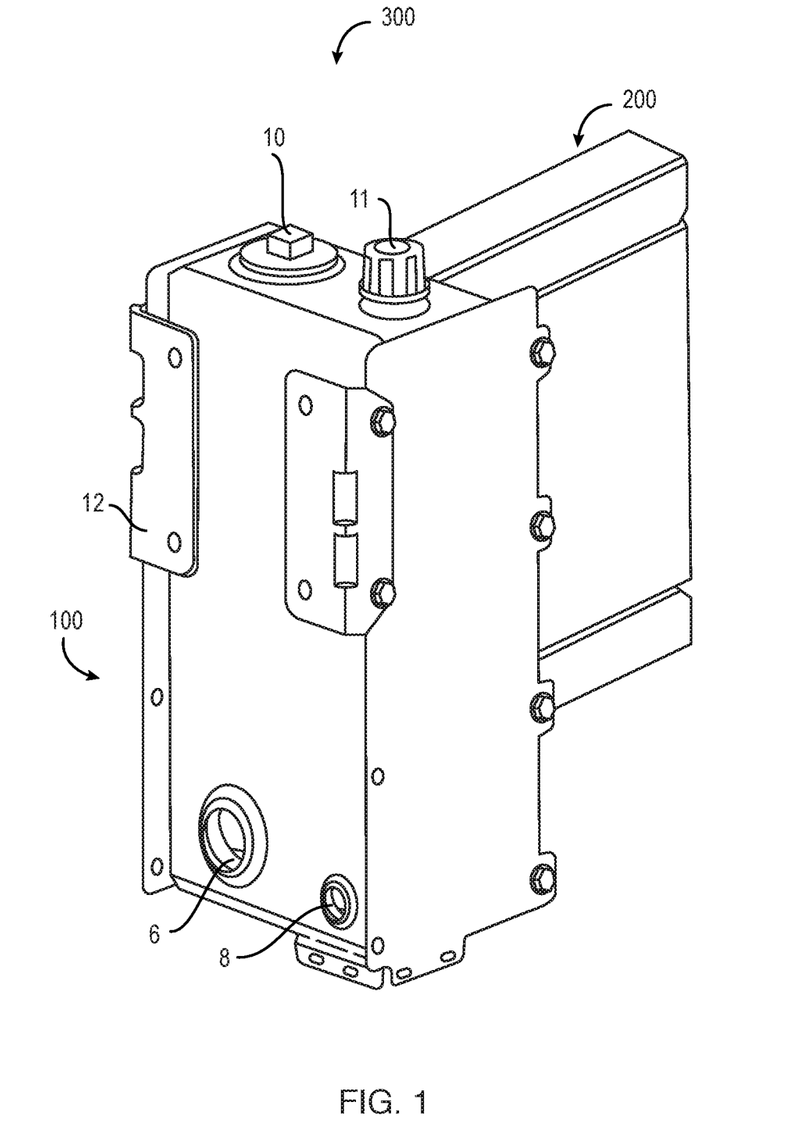
FIG. 1 illustrates a side perspective view of a filtering device including a reservoir and a cooler according to one or more embodiments of the disclosed subject matter.

FIGS. 1 to 8 illustrate a filtering device according to one or more embodiments of the presently disclosed subject matter. FIG. 1 illustrates a filtering device 300 that includes hydraulic fluid filter reservoir 100 (also referred to herein as "reservoir 100" or "reservoir") and cooler 200, according to one or more embodiments of the presently disclosed subject matter. Filtering device 300 can be advantageously employed for filtering and cooling hydraulic fluid used in different applications in hydraulic systems. For example, mineral oils used in hydraulic systems can be filtered and cooled using the filtering device as disclosed herein.

Figure 2A:
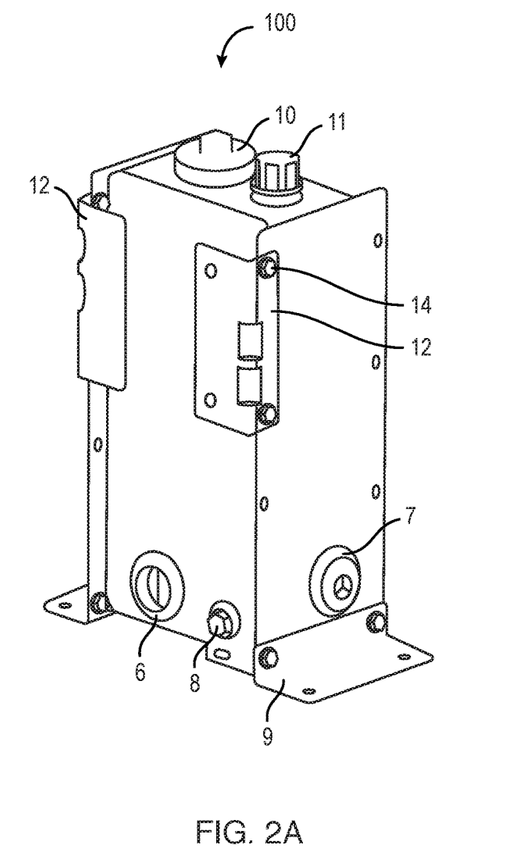
FIGS. 2A and 2B and 2C illustrate front perspective views of the reservoir (including first and second chambers) of a filtering device according to one or more embodiments of the disclosed subject matter.
Figure 2B:
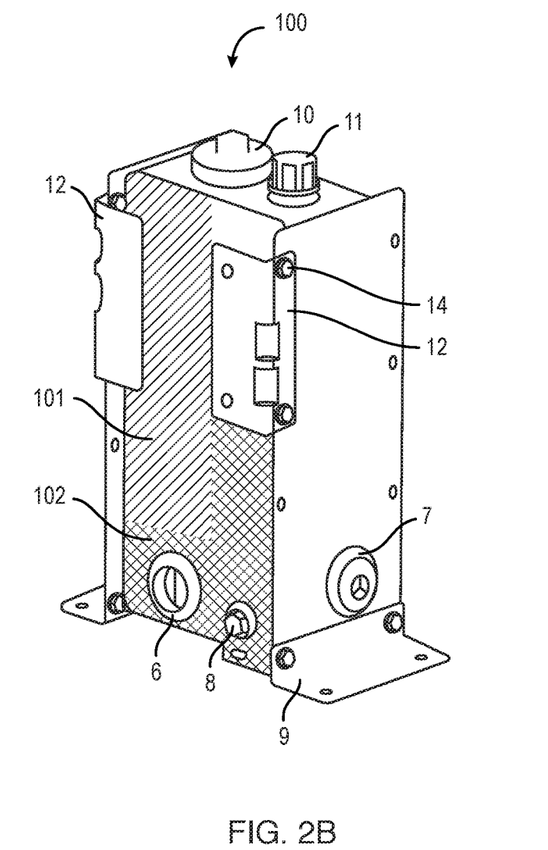
Figure 5A:
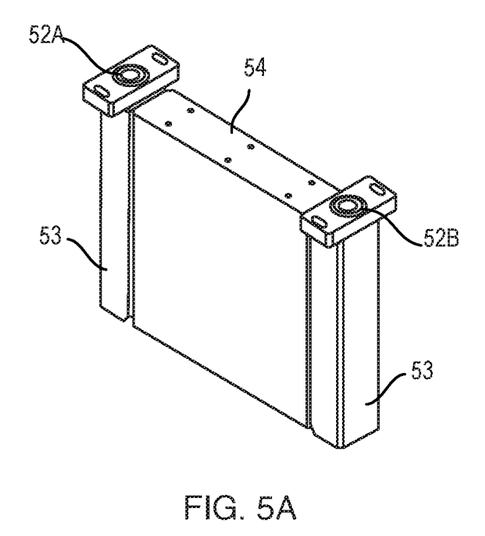
FIG. 5A illustrates a side perspective view and FIG. 5B illustrates a top plan view of a cooler that attaches to the reservoir according to one or more embodiments of the disclosed subject matter.
Figure 5B:
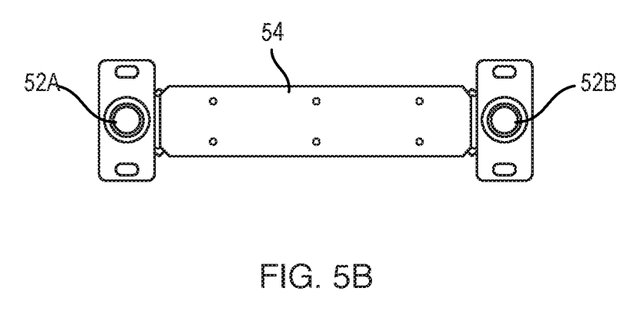

As illustrated in FIG. 2B, reservoir 100 includes two main components—first chamber 101 and second chamber 102—as marked by the respective shadings in FIG. 2B. First chamber 101 includes a fluid inlet connection 1 (see FIG. 2C) located at or near an underside of reservoir 100. First chamber 101 further includes filter section 44 including filter cartridge 10, bypass manifold section 42 including bypass manifold 2 in fluid communication with filter cartridge 10, and inlet to cooler 4 in fluid communication with opening 52A positioned near an upper end of cooler 200 (see FIGS. 5A and 5B, for example). Second chamber 102 includes outlet from cooler 5 in fluid communication with opening 52B positioned near a lower end of cooler 200 (see FIGS. 5A and 5B, for example), and fluid outlet connection 6. Cooler 200 representing a heat exchanger interconnects the first and second chambers through inlet to cooler 4 of first chamber 101 and outlet from cooler 5 of second chamber 102. Cooler 200 can further include tank weldment 53 and core assembly 54, as illustrated in FIGS. 5A and 5B. The fluid flow within cooler 200 can be turbulent flow or laminar flow.

In various embodiments, actuator operated bypass manifold 2 is configured to return hydraulic fluid entering fluid inlet connection 1 directly to fluid outlet connection 6 whenever the first pressure differential at, in or within bypass manifold 2 is above a first value (for e.g., when the first pressure differential is above 60 PSI); bypass manifold 2 is further configured to pass the hydraulic fluid onto an untreated area or cavity of filter cartridge 10 when the first pressure differential at, in or within the bypass manifold is at or below the first value. Similarly, in some embodiments, filter cartridge 10 (see FIG. 4, for example) includes an actuator operated bypass valve (not shown) configured to permit the hydraulic fluid to bypass the filter element of filter cartridge 10 and return to fluid outlet connection 6 whenever the second pressure differential at, in, or within the filter cartridge is greater than a second value (for e.g., when the second pressure differential is above 30 PSI); the actuator operated bypass valve of filter cartridge 10 is further configured to pass the hydraulic fluid through the filter element of filter cartridge 10 when the second pressure differential at, in or within the bypass manifold is at or below the second value.

The first and second values can be configured depending on the application. For example, the first and second values can be set at higher values for applications where the hydraulic pumping system is operating under high hydraulic power (and therefore requiring hydraulic pumps of relatively high rating), and vice versa. In various embodiments, the first and second values can vary anywhere between 0.1 PSI to 100 PSI or higher as necessitated by the application at hand. Generally, however, it can be advantageous to set the second value to be lower than the first value.

Figure 4:
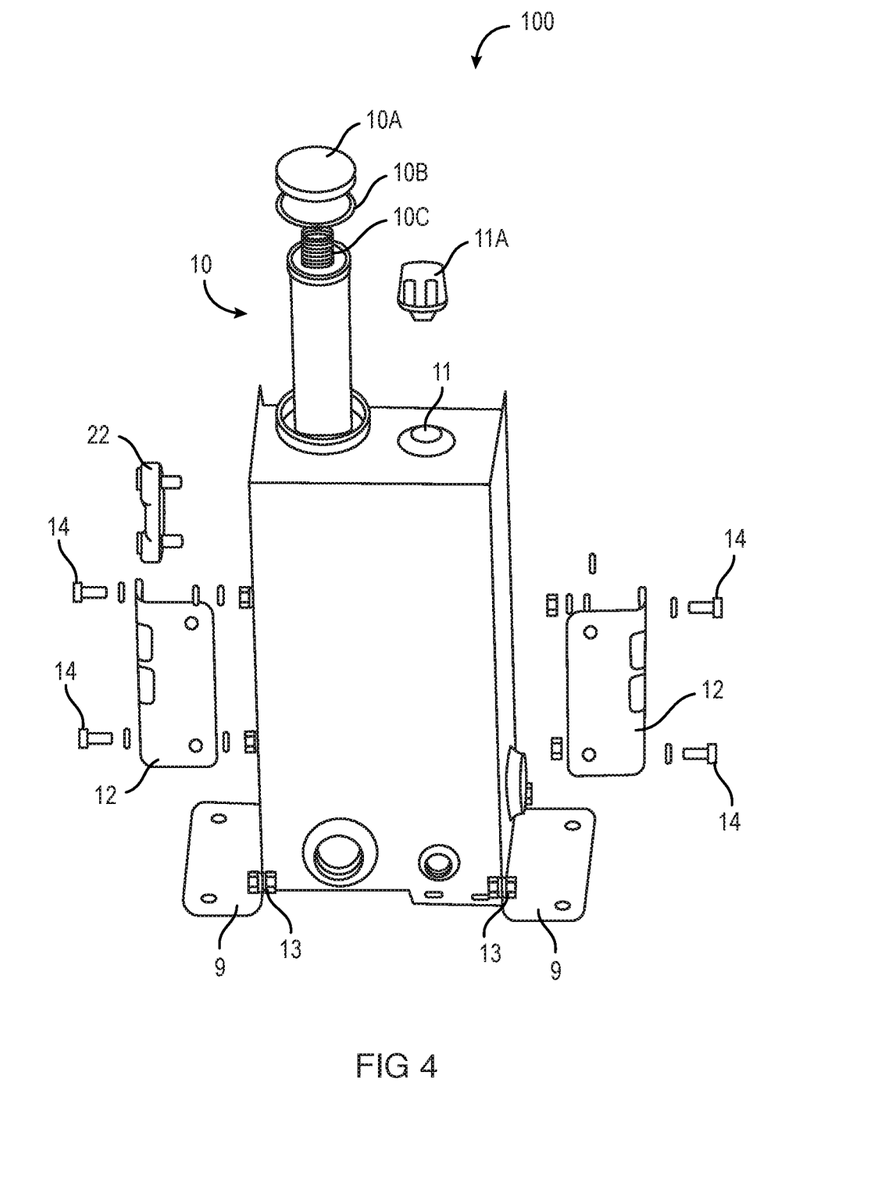
FIG. 4 illustrates a blown-up front perspective view of the reservoir (including first and second chambers) of a filtering device according to one or more embodiments of the disclosed subject matter.

In one embodiment, the filter cartridge in accordance with the presently disclosed subject matter includes a cylindrical filter element having filter material extending over the circumference of the filter element, with an upper end face of the filter cartridge facing a filter cartridge access port covered with an end cap 10A (see FIG. 4, for example). Filtering cartridge 10 furthers include spacer 10B and spring element 10C, as shown in FIG. 4. The lower end face of filter cartridge 10 facing away from end cap 10A includes a fluid through-opening in fluid communication with an outlet opening of bypass manifold 2.

According to one or more embodiments, the fluid inlet connection is in fluid communication with a return line of a hydraulic pump. According to one or more embodiments, the fluid inlet connection is in fluid communication with either a discharge port of the hydraulic pump or a suction port of the hydraulic pump.

According to one or more embodiments, the device is configured for a maximum fluid flow of approximately 35 gallons per minute. According to one embodiment, the device is configured for a maximum fluid flow of approximately 35 gallons per minute without introducing excess air into the fluid and without entrapping air. According to one or more embodiments, the device is configured for a maximum fluid flow of approximately 35 gallons per minute while minimizing or preventing early stages of cavitation.

Hot hydraulic fluid returning from the hydraulic consumer flows from fluid inlet connection 1 into an inlet opening of bypass manifold 2. When the first pressure differential is less than or equal to the first value, the actuator controlled bypass manifold 2 allows the fluid to flow into the filter cartridge through the fluid through-opening of the filter cartridge into an untreated area or cavity of the filter cartridge. Alternately, when the first differential pressure in, at, or within bypass manifold 2 is greater than the first value, the fluid is returned to the fluid outlet connection of the reservoir to be pumped back into the hydraulic drive system. When the second pressure of the fluid in, at or within the filter cartridge is below the second value, the fluid is allowed to flow through the filter element radially from the inside of the filter cartridge to the outside of the filter cartridge and pass into the clean area of section 101, and then flow out of section 101 through inlet to cooler 4 into cooler 200. In other words, the actuator of the bypass valve of filter cartridge is configured to permit fluid flow from a cavity located within filter cartridge to an outside of the filter cartridge when the second differential pressure is less than or equal to the second value. Alternately, when the second differential pressure in, at or within filter cartridge 10 is greater than the second value, the fluid is returned to the fluid outlet connection of the reservoir to be pumped back into the hydraulic drive system. In some embodiments, the hydraulic fluid bypassed by the actuator of the bypass valve of the filter cartridge may be cooled by circulating within the cooler before being returned to the fluid outlet connection of the reservoir to be pumped back into the hydraulic drive system.

In one embodiment, the bypass manifold includes a bypass manifold valve, wherein an actuator of the bypass manifold controls the opening and closing of the bypass manifold valve. Accordingly, when the first pressure differential is less than or equal to the first value, the actuator of the bypass manifold keeps the bypass manifold valve closed whereby the fluid is allowed to flow into the filter cartridge through the fluid through-opening of the filter cartridge into an untreated area or cavity of the filter cartridge. Alternately, when the first differential pressure in, at, or within bypass manifold 2 is greater than the first value, the actuator of the bypass manifold opens the bypass manifold valve whereby fluid is returned to the fluid outlet connection of the reservoir to be pumped back into the hydraulic drive system. In some embodiments, the actuator or actuator mechanism of the bypass manifold includes a biasing means as a spring for controlling the bypass manifold valve; in other embodiments, the actuator or actuator mechanism can include other types of biasing and/or controlling means. Similarly, in some embodiments, the actuator of the bypass value includes a biasing means such as a spring; in other embodiments, the actuator or actuator mechanism can include other types of biasing and/or controlling means.

In some embodiments, the filter cartridge is rated for approximately 10 microns filtering capability. Other ratings above or below 10 microns are also within the scope of this disclosure, with the rating adjusted for the specific application at hand.

In some embodiments, the filtering device as disclosed herein is configured for a maximum fluid flow of approximately 35 gallons per minute. However, the maximum fluid flow capacity of the filtering device can be adjusted for the specific application at hand.

In some embodiments, the reservoir further includes air relief mechanism 11 (a "breather") positioned at or near a top surface of the reservoir to provide for the systematic removal of air present in the hydraulic fluid. As shown in FIG. 4, air relief mechanism 11 is provided with a cover 11A. In some embodiments, the reservoir further includes bottom mount brackets 9 and side mount brackets 12 along with the associated securing mechanisms 13 and 14 respectively for securing the reservoir to bottom and side surfaces respectively.

In some embodiments, inlet to cooler 4 is positioned higher than outlet from cooler 5 such that the filtering device in configured to permit the hydraulic fluid to flow approximately upwards to the inlet to cooler 4, then flow approximately downwards within cooler 200, and then flow out through outlet from cooler 5 in an approximately horizontal direction towards fluid outlet connection 6 of section 102.

Figure 6:
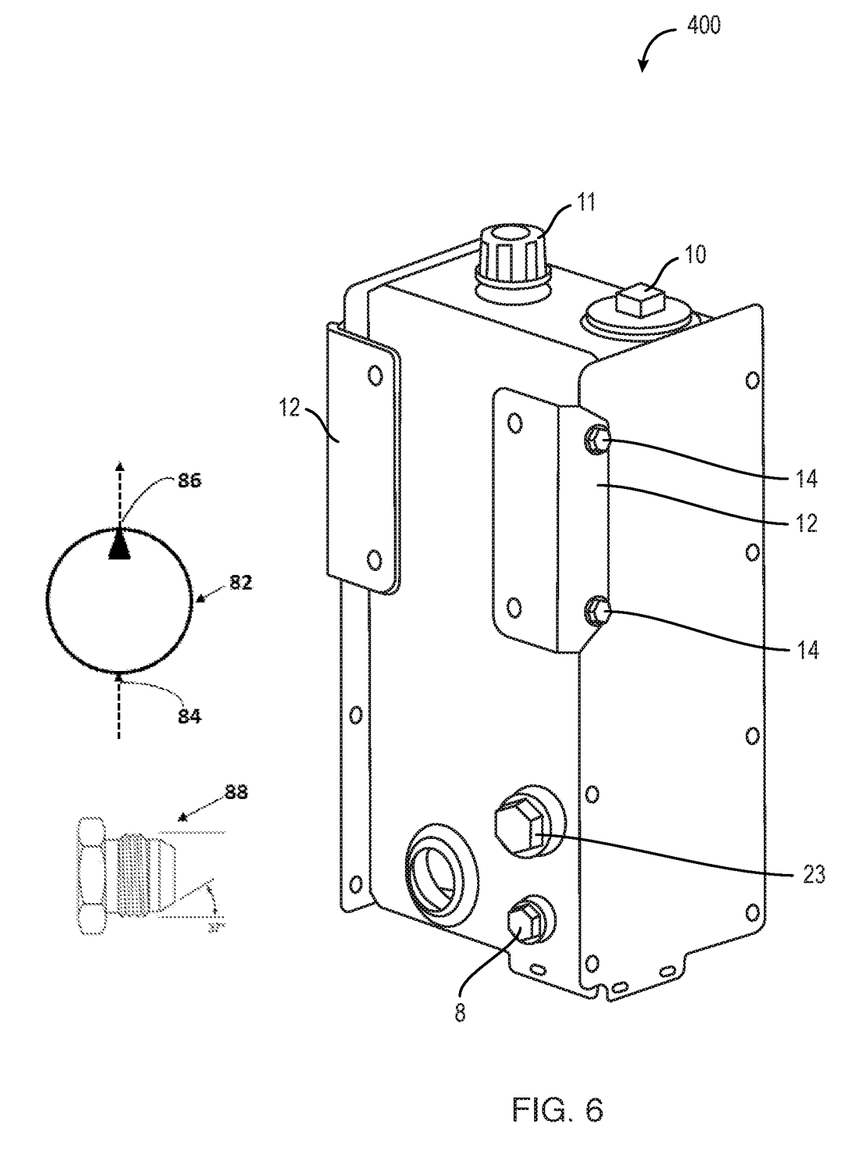
FIG. 6 illustrates a rear perspective view of the reservoir of a filtering device according to one or more embodiments of the disclosed subject matter.

In various embodiments, fluid outlet connection 6 is in fluid communication with the suction side 84 of a hydraulic pump 82, and fluid inlet connection 1 is in fluid communication with the discharge side 86 of the hydraulic pump 82. In one embodiment, fluid inlet connection 1 is a flare fitting 88 with an approximately 37-degree flare seating surface and meets the standards of a SAE 16 fitting. In one embodiment, fluid outlet connection 6 is the suction port of the hydraulic pump of the hydraulic drive system.

In some embodiments, the reservoir is provided with one or more sight ports such as sight port 22 for visually inspecting the inside of the first chamber and/or the inside of the second chamber. In some embodiments, the filtering device further includes cleanout port 7 to facilitate cleaning of the internal area of the reservoir. In some embodiments, the reservoir also includes one or more temperature sensor ports such as temperature sensor port 8.

Figure 2C:
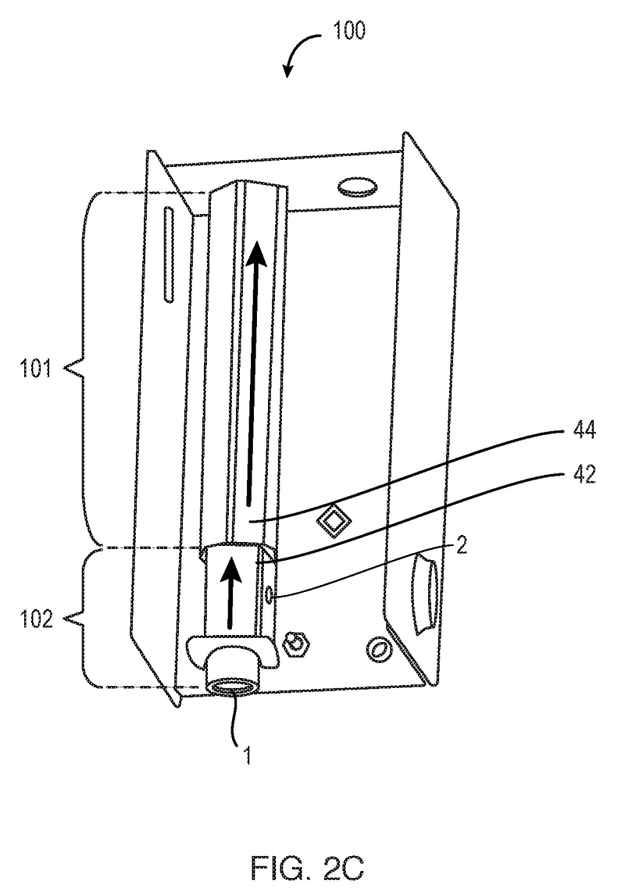
Figure 3A:
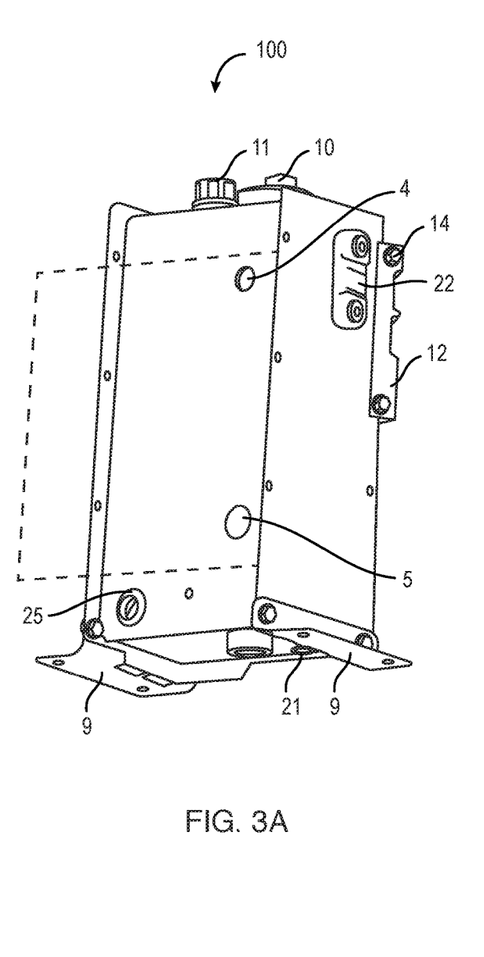
FIGS. 3A and 3B illustrate rear perspective views of the reservoir (including first and second chambers) of a filtering device according to one or more embodiments of the disclosed subject matter.
Figure 3B:
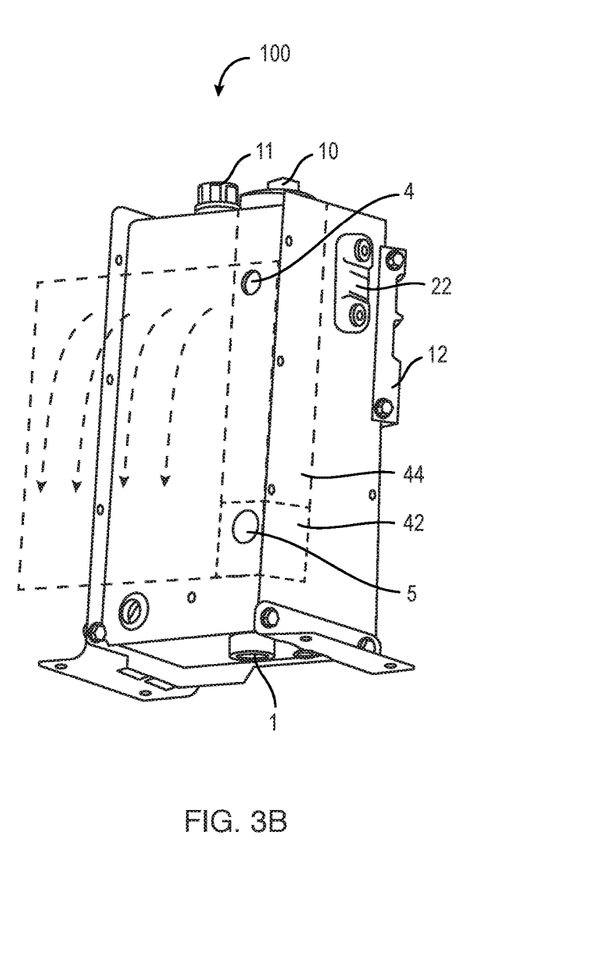

FIGS. 2A and 2B and 2C illustrate front perspective views of the reservoir (including first and second chambers) of a filtering device according to one or more embodiments of the disclosed subject matter. FIG. 2C illustrates the reservoir with its front face removed for ease of understanding of the positioning and orientation of the bypass manifold and the filter cartridge. FIGS. 3A and 3B illustrate rear perspective views of the reservoir (including first and second chambers) of the filtering device according to one or more embodiments of the disclosed subject matter. FIGS. 3A and 3B further illustrate in dotted lines the positioning of cooler 200 relative to reservoir 100. FIG. 3B additionally indicates the approximate direction of flow of hydraulic fluid within cooler 200 by dotted arrows. Cooler 200 effectively operates as a heat exchanger whereby the hydraulic oil is allowed to release heat out to the surrounding atmosphere as the hydraulic fluid flows through cooler 200. FIG. 3A further illustrates a drain 21 with an associated drain plug with drain 21 provided for draining the reservoir.

Figure 7:
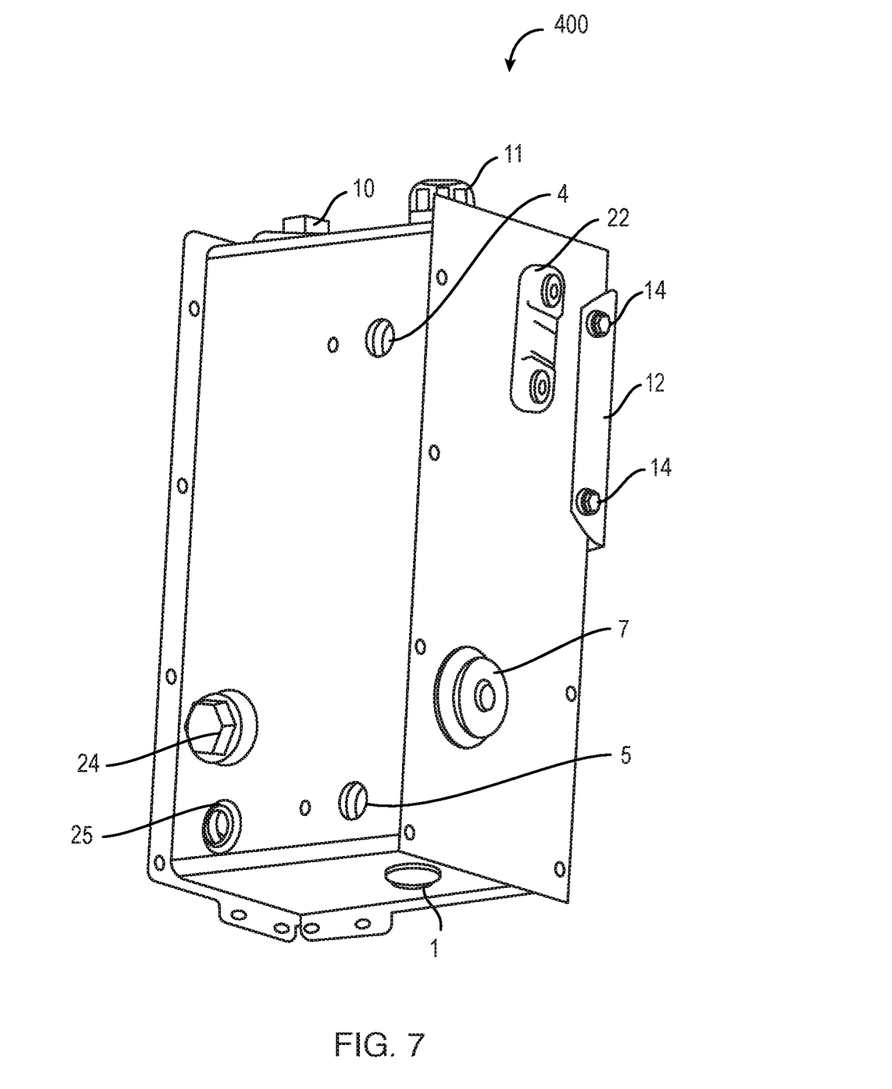
FIG. 7 illustrates a front perspective view of the reservoir of a filtering device according to one or more embodiments of the disclosed subject matter.
Figure 8:
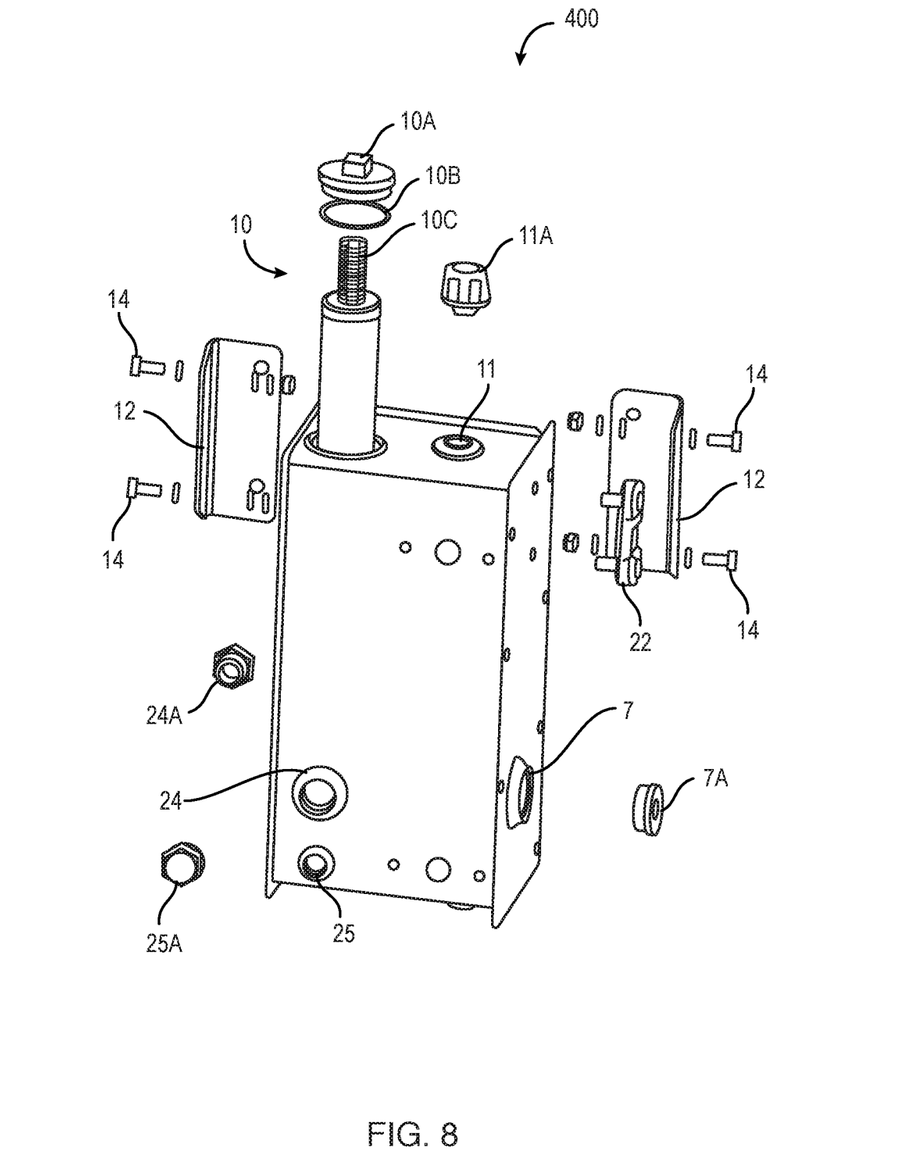
FIG. 8 illustrates a blown-up front perspective view of the reservoir of a filtering device according to one or more embodiments of the disclosed subject matter.

FIGS. 6 to 8 illustrate another embodiment of the filtering device according to the presently disclosed subject matter. As shown in these figures, reservoir 400 includes a front access port 23 in the front of reservoir 400 as well as a rear access port 24 at the rear side of reservoir 400 along with their respective covers. The ports 23 and 24 represent additional access points to the internal chamber of reservoir 400. Reservoir 400 further includes drain port 25 with its associated drain plug 25A. Reservoir 400 may otherwise have similar features as reservoir 100 illustrated in FIGS. 1 to 4. FIG. 8 further shows cover 7A for clean port 7 and cover 24A for rear access port 24.

In one embodiment, the internal surfaces of reservoir 100 are painted with rust inhibiting atomized spray oil fog. In the same embodiment or in a different embodiment, the external surfaces of hydraulic oil filter reservoir 100 are painted with a powder coating. In one embodiment, the outside painting is of stardust silver color. In various embodiments, the reservoir is configured to meet the cleanliness requirement corresponding to a gravimetric maximum particulate weight of 12 milligrams and a maximum particle size of 1200 μm per the ES001 specifications. In one embodiment, the reservoir can have an empty weight of approximately 48.2 lbs. or 21.9 kilograms. In one embodiment, the reservoir can have an internal volume of 4.4 gallons with a hydraulic fluid capacity of 3.9 gallons (this volume includes the filter chamber) at top line of sight gauge 22. In one embodiment, the reservoir is constructed of low carbon steel with minimum yield strength of 25 KSI (kilo-pound per square inch). In one embodiment, the reservoir is rated for 30 GPM of main flow and 2 GPM of case drain flow.

The cooling and filtering of a fluid such as hydraulic fluid by the filtering device as disclosed herein according to one embodiment of the presently disclosed subject matter can proceed as follows. Hot hydraulic oil enters reservoir 100 through inlet 1 located in section 101 and flows into bypass manifold 2 provided with an actuator that is responsive to pressure differentials. When the first pressure differential is above a first value (for, e.g., the first pressure differential is greater than 60 PSI), the actuator of bypass manifold 2 routes the hydraulic fluid to the suction section of reservoir 100, and specifically towards fluid outlet connection 6. However, when the first differential pressure is less than or equal to the first value, the actuator of bypass manifold 2 routes the hydraulic fluid into a cavity located within filter cartridge 10.

Filter cartridge 10 is provided with an actuator operated bypass valve such that the bypass valve operates to permit the hydraulic fluid that reaches the cavity of filter cartridge 10 to bypass the filter element and instead flow towards to fluid outlet connection 6 whenever the second pressure differential in, at or within filter cartridge 10 is above a second value (for, e.g., when the second pressure differential is greater than 30 PSI). By contrast, when the second differential pressure in, at or within the filter cartridge is less than or equal to the second value, the actuator controlling the bypass valve of the filter cartridge allows the hydraulic fluid to flow into the cavity of filter cartridge 10 and then from the inside of filter cartridge 10 to the outside into a clean area of section 101, the hydraulic oil being filtered in the process.

The filtered hydraulic fluid is then permitted to flow into cooler 100 (from a top region of cooler 200 to a bottom region of cooler 200), and then flow out of cooler 200 through outlet from cooler 5 towards fluid outlet connection 6 of section 102. In some embodiments, fluid outlet connection 6 can be the suction port of a hydraulic pump that returns the hydraulic oil that has been filtered by reservoir 100 and cooled by cooler 200 back into the work environment of a hydraulic pumping system, i.e., the filtered and cooled hydraulic fluid is routed back to the hydraulic consumer. Accordingly, whenever the respective pressure differentials are below the first and second values, the hydraulic fluid is filtered (as it flows through the filter element radially from the inside of the filter cartridge to the outside of the filter cartridge) and cooled within cooler 200 as the filtered hydraulic fluid flows out of the filter cartridge into a clean area of section 101, and then into and out of cooler 200.

Embodiments of the filtering device as disclosed herein can advantageously allow complete control over oil flow in all conditions by providing for the fluid inlet connection to be in fluid connection with the bypass manifold, with the bypass manifold in turn being in fluid communication with a filter cartridge, and further providing a cooler interconnected to the reservoir in the manner explained above. Embodiments of the presently disclosed subject matter can advantageously allow maximum oil flow of 35 GPM or more with the internal configuration and plumbing of the filtering device as disclosed herein facilitating such high flow rates. Such high flow rates can, in turn, advantageously allow the hydraulic drive system installed on a truck or a similar other setting to perform more work in less time irrespective of the condition of the hydraulic fluid (i.e., irrespective of the temperature, viscosity, and particulate matter content of the hydraulic fluid, among others) while simultaneously limiting or preventing the presence of air within the hydraulic fluid. As a person of relevant skill in the art understands, presence of air within the hydraulic fluid being circulated within a hydraulic fluid pumping system generates energy loss.

Accordingly, embodiments of the presently disclosed subject matter can advantageously filter the hydraulic fuel first, cool the hydraulic fuel then, and return the hydraulic fluid back into the hydraulic fluid pumping system, while simultaneously permitting the bypass of cold and/or dirty hydraulic oil without the need for a separate set of piping, tanks or pumps to handle situations where the hydraulic oil is dirty and/or cold.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

These and other changes can be made to the disclosure in light of the Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed is:

1. A device for cooling and filtering hydraulic fluid, the device comprising:
    a first chamber that includes a fluid inlet connection, a filter cartridge, a bypass manifold, and an inlet to a cooler; and
    a second chamber that includes an outlet from the cooler and a fluid outlet connection;
    wherein the cooler interconnects the first and second chambers through the inlet of the first chamber and the outlet of the second chamber,
    wherein the bypass manifold is configured to return fluid entering the fluid inlet connection to the fluid outlet connection bypassing the cooler and the filter cartridge when a first pressure differential at the bypass manifold is above a first value, and to pass the fluid onto the filter cartridge when the first pressure differential at the bypass manifold is at or below the first value.

2. The device of claim 1, wherein the filter cartridge includes a bypass valve configured to permit the fluid to bypass a filter element and return to the fluid outlet connection when a second pressure differential at the filter cartridge is greater than a second value.

3. The device of claim 2, wherein the first value is approximately 60 PSI and the second value is approximately 30 PSI.

4. The device of claim 2, wherein the filter cartridge is rated for approximately 10 microns.

5. The device of claim 1, wherein the bypass manifold includes a bypass manifold valve that is spring-actuated, wherein the bypass manifold valve of the bypass manifold operates to return fluid entering the fluid inlet connection to the fluid outlet connection bypassing the cooler and the filter cartridge when a first pressure differential at the bypass manifold is above a first value, and to pass the fluid onto the filter cartridge when the first pressure differential at the bypass manifold is at or below the first value.

6. The device of claim 2, wherein the bypass valve is spring-actuated.

7. The device of claim 2, wherein the filter cartridge is configured for fluid flow from an inside of the filter cartridge to an outside of the filter cartridge.

8. The device of claim 1, wherein the inlet to the cooler is positioned higher than the outlet from the cooler.

9. The device of claim 8, wherein the device in configured to permit the fluid to flow upwards to the inlet to the cooler, flow downwards within the cooler, and flow out through the outlet of the cooler to the fluid outlet connection.

10. The device of claim 1, wherein the fluid outlet connection is in fluid communication with a suction port of a hydraulic pump.

11. The device of claim 1, wherein the fluid inlet connection is in fluid communication with a return line of a hydraulic pump.

12. The device of claim 1, wherein the device is configured for a maximum fluid flow of approximately 35 gallons per minute.

13. The device of claim 1, wherein the fluid inlet connection includes a flare fitting with an approximately 37-degree flare seating surface.

14. The device of claim 1, further comprising an air relief mechanism at or near a top surface of the device.

15. The device of claim 1, further comprising a filter cartridge access port at or near a top surface of the device.

16. The device of claim 1, wherein the first chamber further comprises a sight port for inspecting an inside of the first chamber.

17. The device of claim 1, wherein the second chamber further comprises a sight port including a gauge for checking the level of hydraulic fluid in the second chamber.

18. The device of claim 1, wherein the second chamber further comprises one or more of a cleanout port and a sight port.

19. The device of claim 1, wherein the first chamber comprises a temperature sensor port.

20. The device of claim 1, wherein the second chamber comprises a temperature sensor port.

* * * * *